United States Patent

Chou

Patent Number: 6,006,405
Date of Patent: Dec. 28, 1999

[54] HOOK

[76] Inventor: An-Chuan Chou, No. 212, Yung An Street, Tainan, Taiwan

[21] Appl. No.: 09/109,743

[22] Filed: Jul. 2, 1998

[51] Int. Cl.$^6$ ...................................................... F16G 11/00
[52] U.S. Cl. .................. 24/129 R; 24/129 C; 24/131 R; 24/370
[58] Field of Search ............................. 24/129 R, 129 A, 24/129 B, 129 C, 129 D, 131 R, 131 C, 115 K, 573.5, 573.7, 370, 346, 18, 706.1, 716, 456, 552–555, 598.4

[56] References Cited

U.S. PATENT DOCUMENTS

| 749,235 | 1/1904 | Smith | 24/129 R |
| 1,463,456 | 7/1923 | Bear | 24/129 R |
| 1,531,977 | 3/1925 | Ritch et al. | 24/370 |
| 1,724,791 | 8/1929 | Cain | 24/129 C |
| 2,636,704 | 4/1953 | Norberg | 24/131 R |
| 5,033,169 | 7/1991 | Bindon | 24/129 R |

FOREIGN PATENT DOCUMENTS

| 0356759 | 12/1905 | France | 24/370 |
| 0054774 | 12/1890 | Germany | 24/598.4 |

*Primary Examiner*—Victor N. Sakran
*Attorney, Agent, or Firm*—Rosenberg, Klein & Bilker

[57] ABSTRACT

A hook for a rope includes a vertical inverted U-shaped hook portion and a horizontal base with more than three rings for winding and binding an elastic rope thereon to keep an end of the rope securely enough not to loosen off. The hook may be made with a steel wire bent or formed by means of injecting and shooting process.

2 Claims, 4 Drawing Sheets

HOOK

BACKGROUND OF THE INVENTION

This invention relates to a hook, particularly to one having a simple stable structure not easily broken in practical use to prevent damage from happening to the things the hook is used for.

Elastic ropes are widely in use for binding things and goods in a stabilized condition. A conventional binding rope shown in FIG. 6 includes an elastic rope 10 with a constrict end 101, and an inverted U-shaped hook 11 with a bent end 112 and a helical spring portion 111 formed extending down from the hook 11 for the constrict end 101 to pass through upward. Then another inverted U-shaped hook 11 is fixed with a constrict end 101 of the same rope 10 so that the binding rope 10 is connected to the inverted U-shaped hook 11 respectively bound tightly on the two ends. And the two bent ends 112 are used for securing the hook 11 on an object.

However, after the conventional binding rope is used for a long period of time, the helical spring portion 111 may deform, unable to keep the constrict end 101 in a stabilized condition to let it loosen off. Further, the binding rope 10 may loosen off the hook 11 if the constrict end 101 cannot endure a pulling force. Then if the whole rope 10 suddenly loosens off the hook 11, the rope 10 may bounce to strike on the body of a user, who may be wounded or hurt.

SUMMARY OF THE INVENTION

The purpose of the invention is to offer a hook having a vertical inverted U-shaped hook portion and a horizontal multi-ringed base portion under the hook portion. Then an elastic rope is bound on the base portion, forming the direction of an operating force identical with the hook portion in case the hook is pulled by exterior force. In addition, an end of the elastic rope is dexterously wound around the multiringed base portion in such a way that the elastic rope never loosens off the hook. Then this hook is quite safe to use with a rope.

BRIEF DESCRIPTION OF DRAWINGS

This invention will be better understood by referring to the accompanying drawings, wherein.

DETAILED DESCRIPTION OF DRAWINGS

Figure 1:
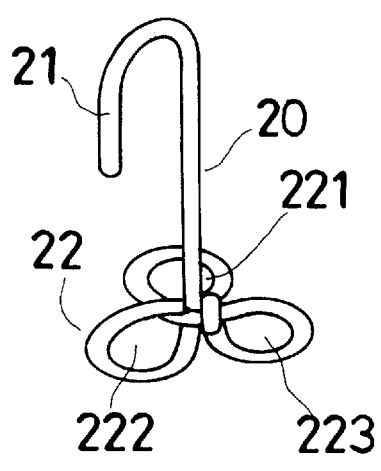
FIG. 1 is a perspective view of a first embodiment of a hook of the present invention.

A first embodiment of a hook 20 of the present invention, as shown in FIG. 1, includes a vertical inverted U-shaped hook portion 21 and a horizontal multi-ringed base 22 formed under the hook portion 21. The horizontal multi-ringed base 22 has a first ring 221, a second ring 222, and a third ring 223 in a mutually abutting condition.

Figure 2:
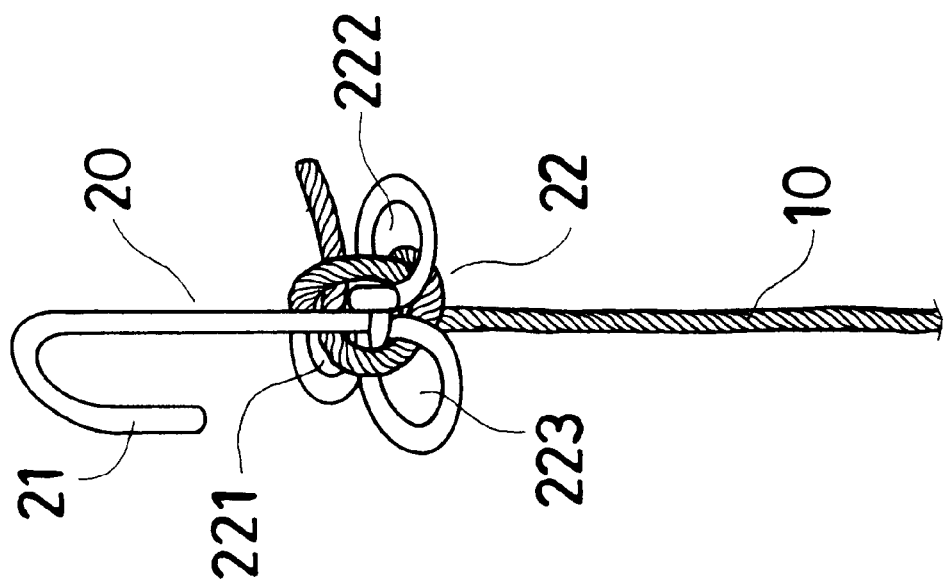
FIG. 2 is a perspective view of a hook and an elastic rope wound around the hook of the present invention.
Figure 2:
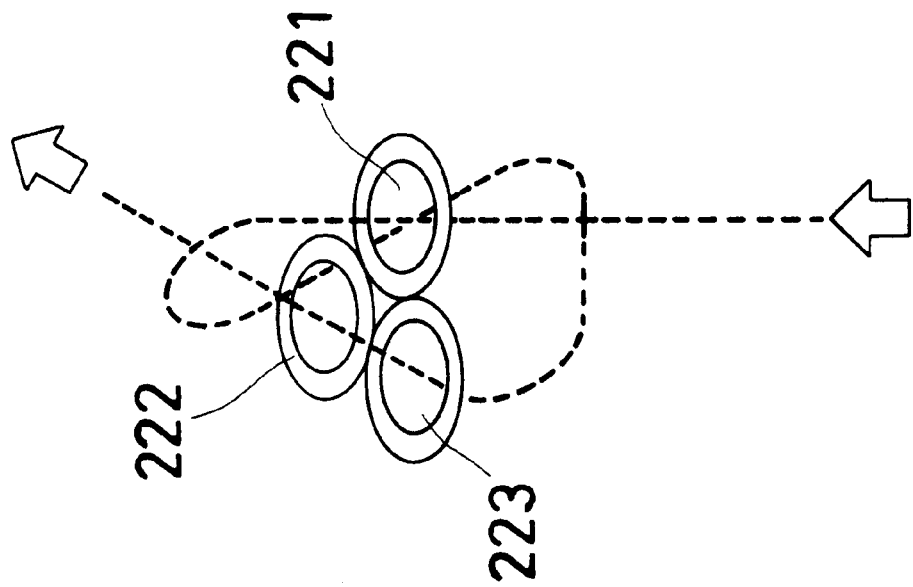

Then an elastic rope 10 is to be bound on the hook 20, with an end of the rope 10 being inserted through the first ring 221 from the lower side, then through down the second ring 222 from the upper side, is laid crossing with each other, further inserted through up the third ring 223 from the lower side, and then placed under the part of the rope between the first ring and the second ring as shown in FIG. 2. The end of the rope 10 can then be tightly bound on the hook 20 when the rope 10 is pulled hard by a force in the same direction as the vertical condition of the hook 20 which may have a stabilized hooking force and be safe with no fear that the rope loosens off.

Figure 3:
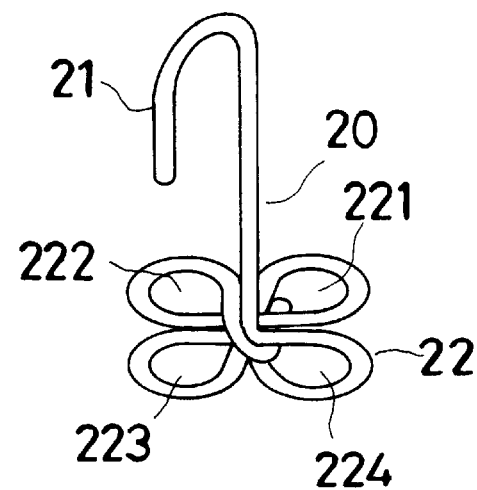
FIG. 3 is a perspective view of a second embodiment of a hook of the present invention.

A second embodiment of a hook 20 is shown in FIG. 3, having a horizontal base 22 provided with four rings 221, 222,223,224.

Figure 4A:
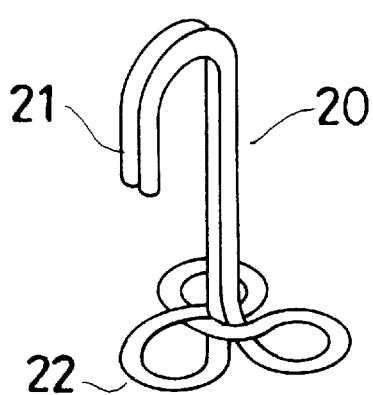
FIG. 4A is a perspective view of a third embodiment of a hook of the present invention.

A third embodiment of a hook is shown in FIG. 4A, having an inverted U-shaped double hook 20 with a double hook portion 21 formed with two steel wires closely put together and a horizontal base 22 provided with three rings formed with one wire only.

Figure 4B:
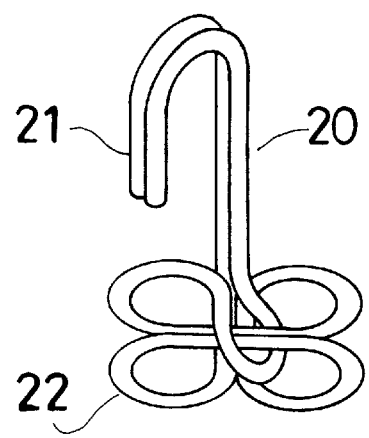
FIG. 4B is a perspective view of a fourth embodiment of a hook of the present invention.

A fourth embodiment of a hook is shown in FIG. 4B, having an inverted U-shaped double hook 20 with a double hook portion 21 formed with two steel wires closely put together and a horizontal base 22 provided with four rings formed with one wire only with an additional fourth ring 224.

Figure 5B:
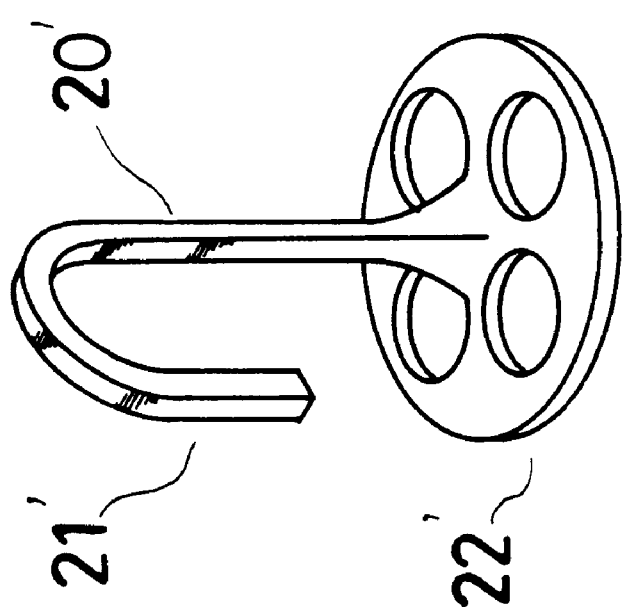
FIG. 5A is a perspective view of a fifth embodiment of a hook of the present invention; and, FIG. 5B is a perspective view of a sixth embodiment of a hook of the present invention.
Figure 5A:
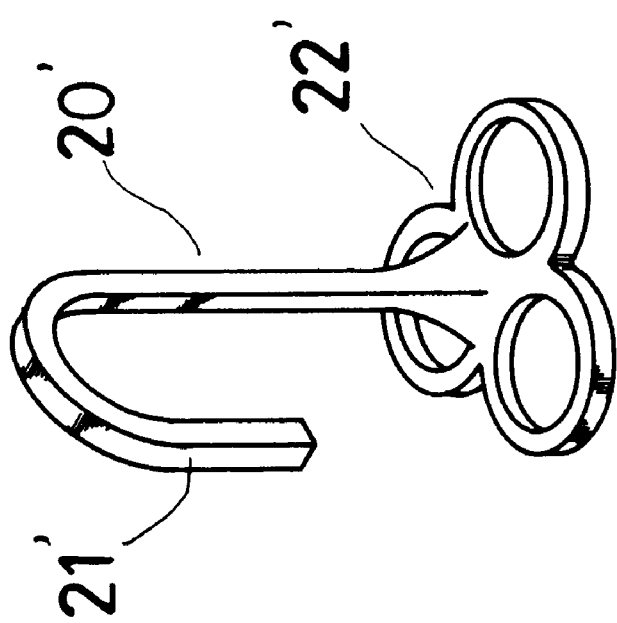
Figure 6:
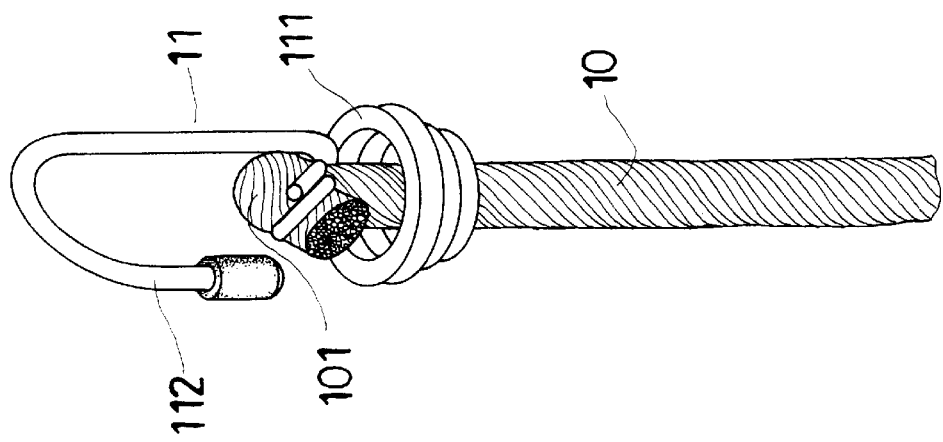

A fifth embodiment of a hook is shown in FIG. 5A, made integral by means of injecting and shooting plastic process, having three rings in the horizontal base 22' and a single inverted U-shaped hook 20' with a single hook portion 21'.

A sixth embodiment of a hook is shown in FIG. 5B, made integral in the same way as the fifth embodiment having four rings in the horizontal base 22' and a single inverted U-shaped hook 20' with a single hook portion 21'.

In winding to bind an elastic rope on the hook operating force of the rope can be identical with that of the hook, and the end of the rope wound on the hook is self crossing with each other and kept tight enough not to loosen off, improving the defects of the conventional hook described above, which is caused by different force locations. Consequently, the hook in the invention is quite safe to use, preventing potent dangers from happening.

What is claimed is:

1. A hook comprising an inverted wire hook portion extending in a longitudinal direction, and a base integrally formed at a proximal end of said hook portion and extending in a direction substantially orthogonal said longitudinal direction, said base being formed by at least three adjoining rings angularly spaced around said proximal end of said hook portion, each of said rings having a longitudinally directed through opening for threading of an elastic rope therethrough and securing the elastic rope for applying an operating force coaxial with an operating force of said hook portion.

2. A hook comprising an inverted wire hook portion extending in a longitudinal direction, and a base integrally formed at a proximal end of said hook portion and extending in a direction substantially orthogonal said longitudinal direction, said base being formed by four adjoining rings angularly spaced around said proximal end of said hook portion, each of said rings having a longitudinally directed through opening for threading of an elastic rope therethrough and securing the elastic rope for applying an operating force coaxial with an operating force of said hook portion.

* * * * *